Figure 1:
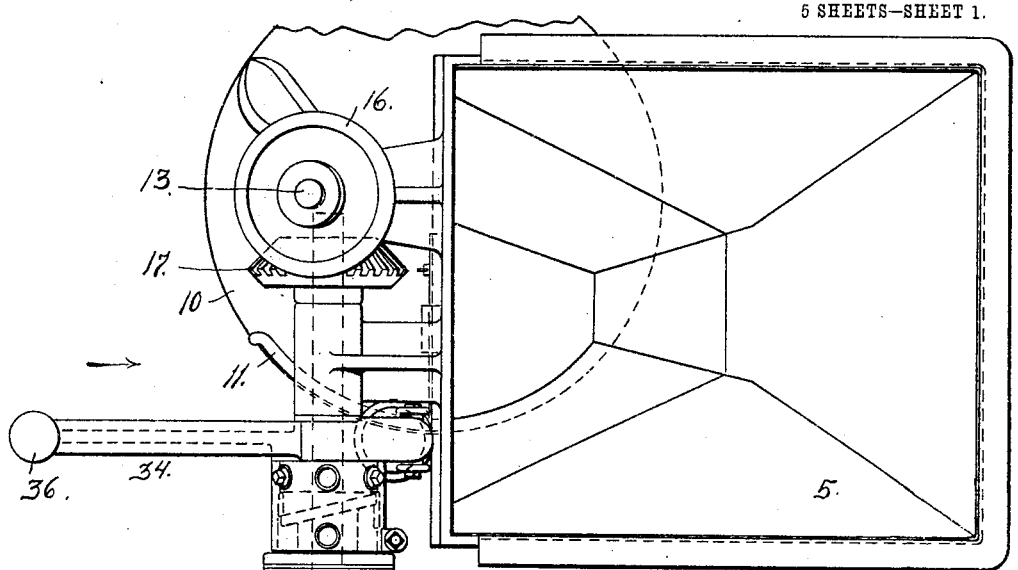

No. 805,128. PATENTED NOV. 21, 1905.
N. V. FITTS.
ORE FEEDER.
APPLICATION FILED OCT. 24, 1904.

5 SHEETS—SHEET 1.

WITNESSES:
Otto E. Hoddick
Dena Nelson

INVENTOR.
N. V. FITTS
BY
ATTORNEY.

No. 805,128. PATENTED NOV. 21, 1905.
N. V. FITTS.
ORE FEEDER.
APPLICATION FILED OCT. 24, 1904.
5 SHEETS—SHEET 2.
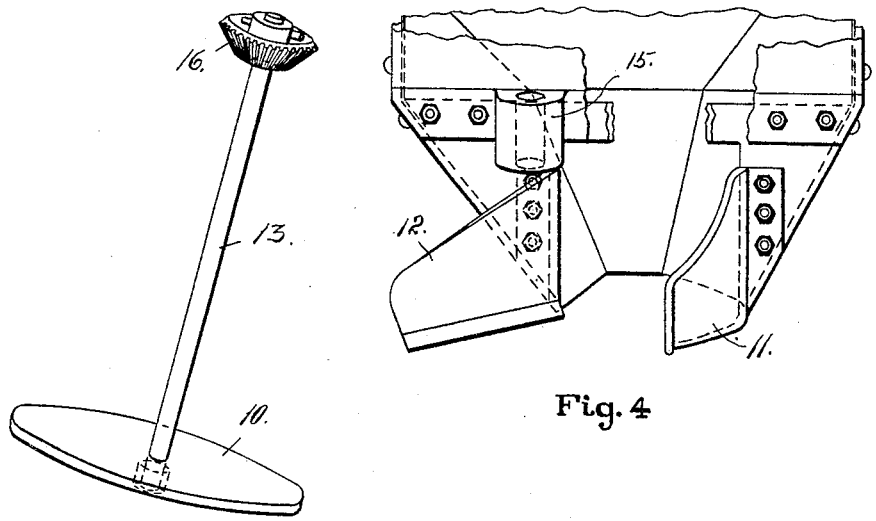
Fig. 4
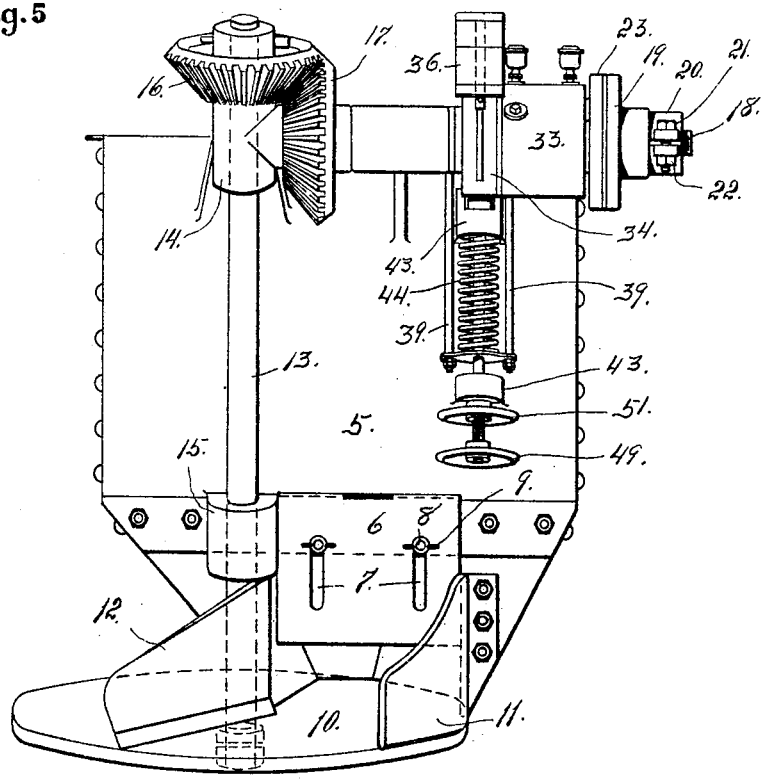
Fig. 5
Fig. 3
WITNESSES:
Otto E. Hoddick
Dena Nelson
INVENTOR.
N. V. FITTS
BY
ATTORNEY.

No. 805,128. PATENTED NOV. 21, 1905.
N. V. FITTS.
ORE FEEDER.
APPLICATION FILED OCT. 24, 1904.
5 SHEETS—SHEET 3.
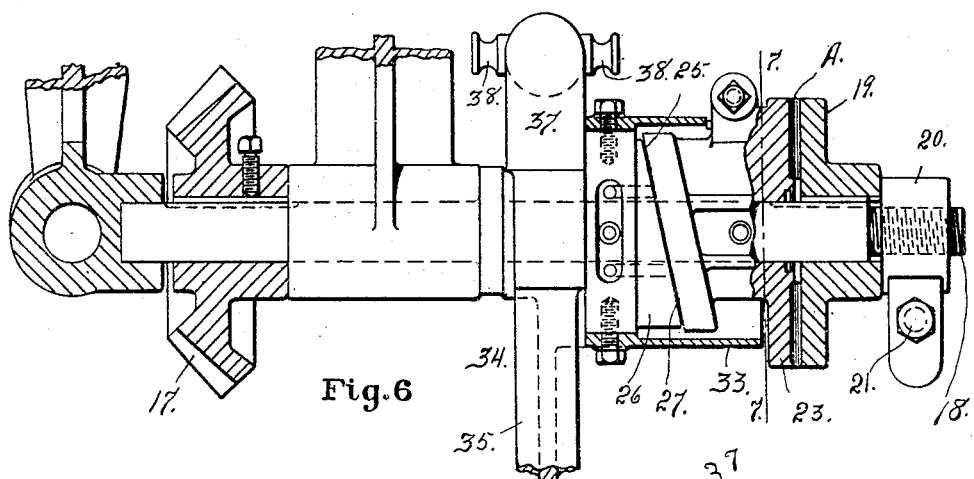
Fig. 6
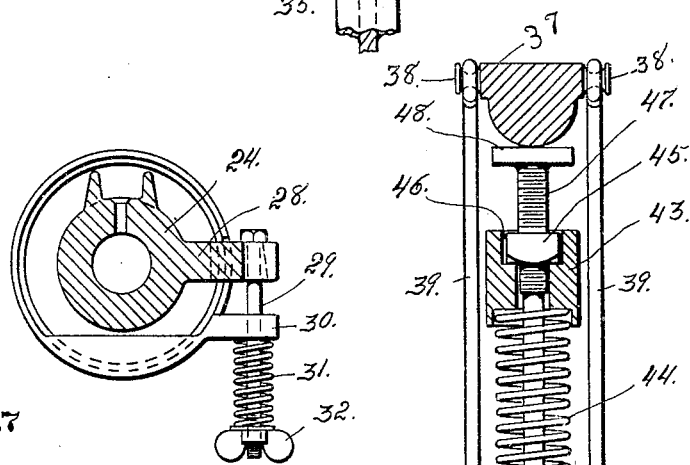
Fig. 7
Fig. 8
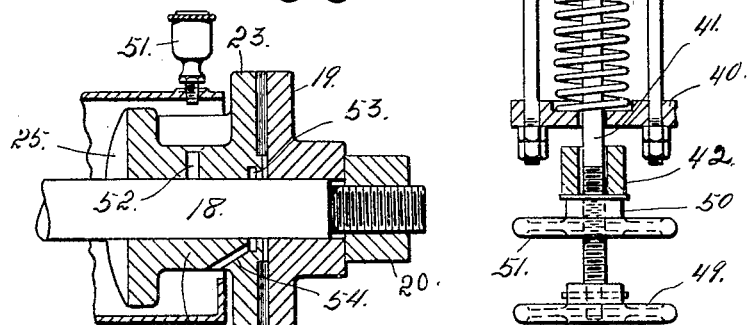
Fig. 9
WITNESSES:
Otto E Hoddick
Dena Nelson
INVENTOR.
N. V. FITTS
BY 
ATTORNEY.

No. 805,128. PATENTED NOV. 21, 1905.
N. V. FITTS.
ORE FEEDER.
APPLICATION FILED OCT. 24, 1904.

5 SHEETS—SHEET 4.

WITNESSES:
INVENTOR.
N. V. FITTS
BY
ATTORNEY.

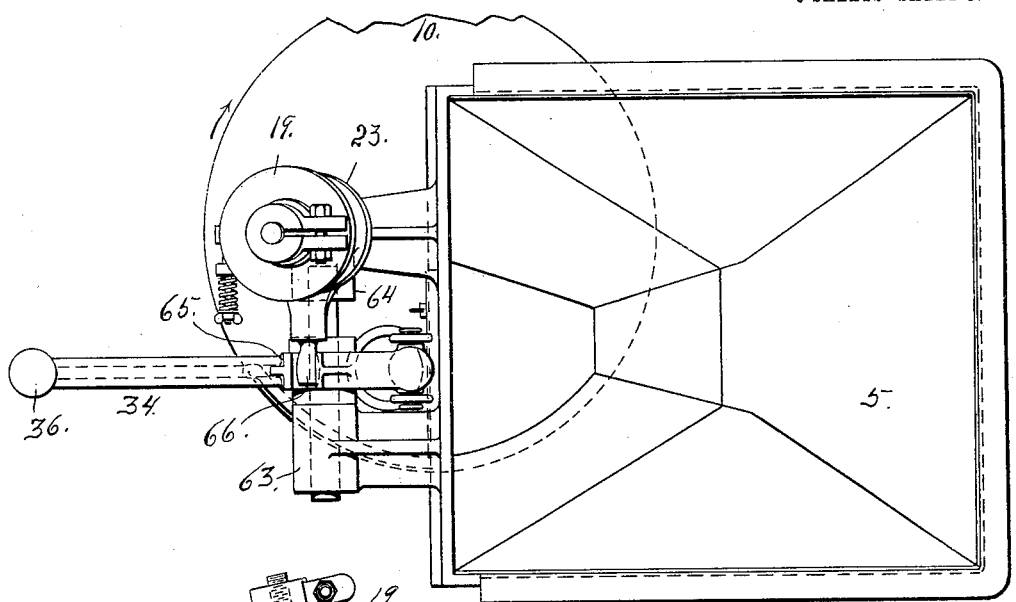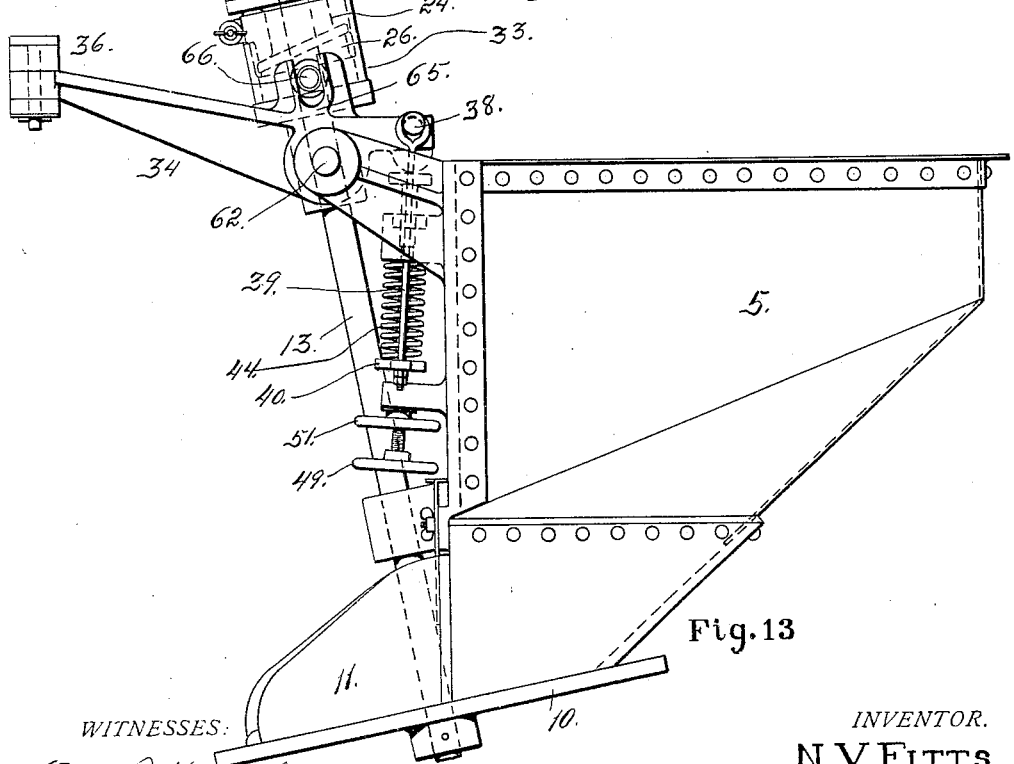

UNITED STATES PATENT OFFICE.

NORMAN V. FITTS, OF DENVER, COLORADO, ASSIGNOR OF ONE-HALF TO THE COLORADO IRON WORKS COMPANY, OF DENVER, COLORADO.

ORE-FEEDER.

No. 805,128.     Specification of Letters Patent.     Patented Nov. 21, 1905.

Application filed October 24, 1904. Serial No. 229,678.

*To all whom it may concern:*

Be it known that I, NORMAN V. FITTS, a citizen of the United States, residing in the city and county of Denver and State of Colorado, have invented certain new and useful Improvements in Ore-Feeders; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in ore-feeders, and is especially intended for use in feeding crushed ore to stamp-mills and pulverizing-rolls or to any apparatus where a regular discharge or delivery of the ore to the pulverizing apparatus is desired. It is also evident that it may be employed in all similar or analogous relations. This apparatus belongs to the class of ore-feeders in which a rotary disk is mounted below the open mouth of a hopper and operating mechanism employed for intermittently actuating the disk, whereby a quantity of the ore is intermittently discharged from the disk at regular intervals. As the disk is actuated one of the wings or parts extending outwardly from the body of the hopper engages the disk and causes the ore to be discharged therefrom, the disk being suitably inclined and arranged in such proximity to the apparatus to which the ore is to be delivered to accomplish the aforesaid function.

My improvement consists in the mechanism for operating the disk, and includes friction-faces which are forced into operative engagement by engaging wedge-shaped parts, one of which is fast on a part actuated in any suitable manner, while the other wedge-shaped part is rigidly connected with one of the friction-faces, the other friction-face being fast on a shaft geared to the shaft which carries the rotary disk. I also employ suitable means for taking up all lost motion between the friction-faces, whereby as the operating part is actuated the movement of the disk immediately commences, since no time is lost in bringing the parts into direct operative engagement.

In one form of my improved construction one of the friction-faces is fast on the disk-shaft, while the other friction-face is loose thereon and actuated by the engagement of the wedge-shaped faces when one of the latter is given a partial rotary movement, the cam action of the wedge-shaped faces being sufficient to crowd the last-named friction-face tightly against the friction-face fast on the shaft of the disk.

My improved ore-feeder may be operated from a stamp-stem, or it may be actuated by means of a rotary cam so shaped as to impart an intermittent movement to the shaft of the disk, whereby the same result is accomplished as when the disk is actuated from the stamp.

Having briefly outlined my improved construction, as well as the function it is intended to perform, I will proceed to describe the same in detail, reference being made to the accompanying drawings, in which is illustrated an embodiment thereof.

Figure 2:
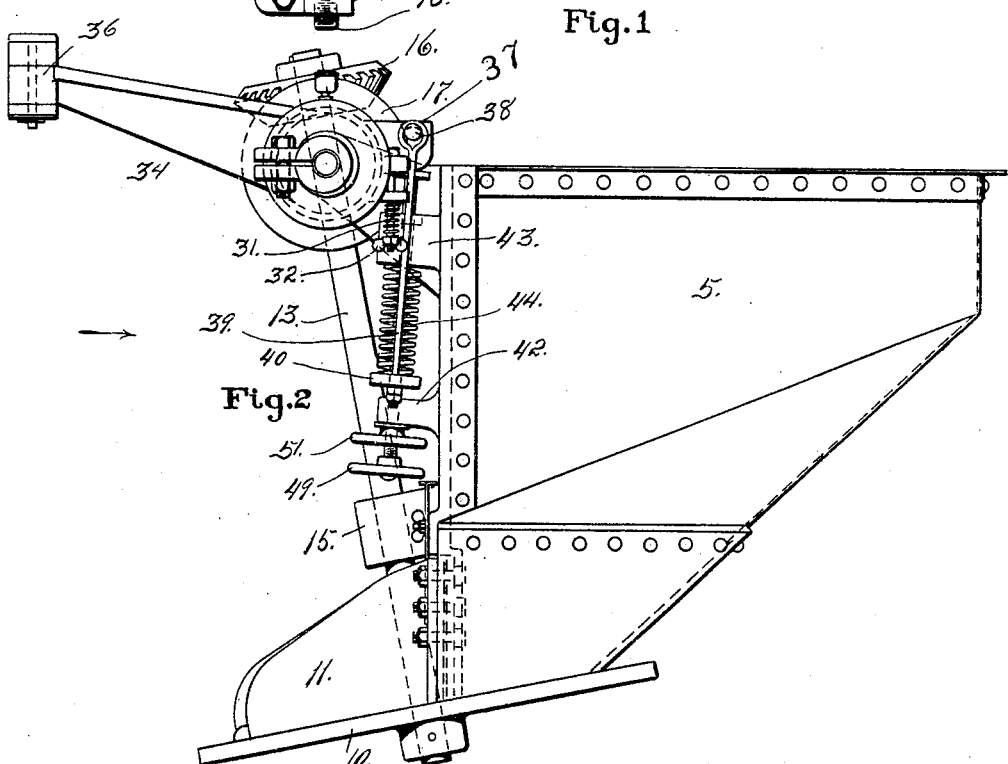
Figure 10:
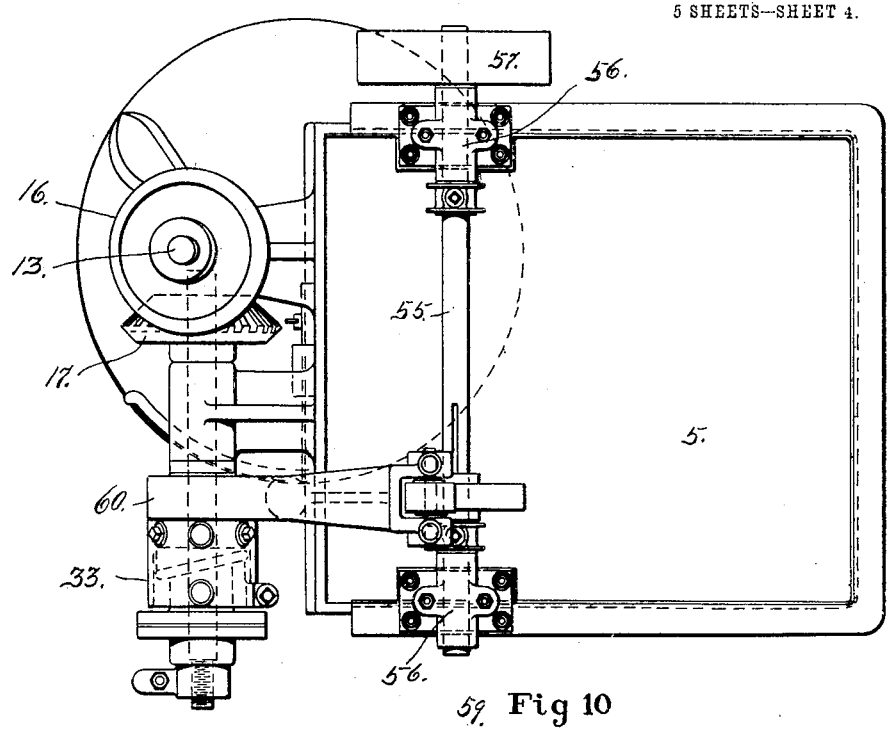
Figure 11:
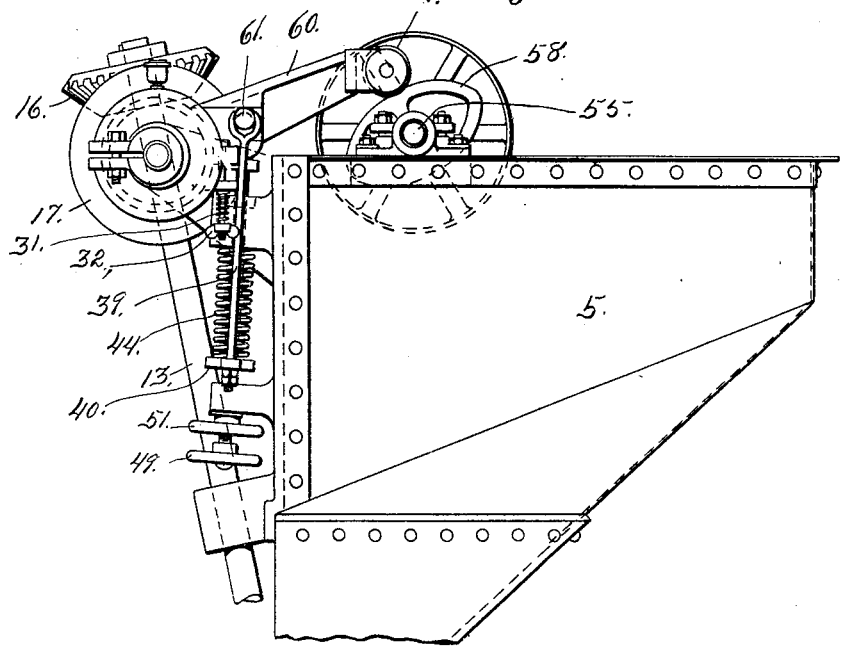

In the drawings, Figure 1 is a top plan view of an ore-feeder equipped with my improvements. Fig. 2 is a side elevation of the same. Fig. 3 is a front view or a view looking in the direction of the arrows in Figs. 1 and 2. Fig. 4 is a fragmentary detail view of the hopper, showing its lower portion, together with the wings which engage the rotary disk. Fig. 5 is a detail view of the disk shown in connection with its shaft and gear. Fig. 6 is a top view, partly in section, illustrating the horizontal shaft carrying the friction-faces and also showing its other equipment, the parts being shown on a larger scale than in the principal views. Fig. 7 is a section taken on the line 7 7, Fig. 6. Fig. 8 is a detail view illustrating the means for returning the actuating-arm and its connections to its normal position, the parts being shown on a larger scale. Fig. 9 is a sectional view taken through the friction-faces, the shaft upon which they are mounted being shown in elevation. Fig. 10 is a top plan view illustrating a modified form of construction, the ore-feeder in this case being actuated from a rotary shaft. Fig. 11 is a side elevation of the same, the lower portion being broken away. Figs. 12 and 13 are top plan and side elevations, respectively, illustrating still another form of construction.

The same reference characters indicate the same parts in all the views.

Referring first more especially to Figs. 1 to 11, inclusive, let the numeral 5 designate the body of the hopper, which is open at the bottom and in front, its front opening being controlled by a vertically-adjustable slide-gate 6, provided with slots 7, through which project bolts 8, to which are applied thumb-nuts 9. By loosening these nuts it is evident the gate may be raised and lowered at will for the purpose of controlling the front opening of the hopper. The bottom opening of the hopper is closed by the rotary disk 10, which is suitably inclined, as best illustrated in Figs. 2, 3, 5, and 13. Connected with the hopper and extending outwardly on both sides of the front opening are two wings 11 and 12. The wing 11 is located close to the outer edge of the disk and prevents the material from falling off from the disk on that side as it leaves the hopper. The wing 12 is adapted to discharge the ore from the disk as the latter is intermittently actuated, and it is so shaped as to produce this result.

The disk 10 is made fast to the lower extremity of an inclined shaft 13, journaled in upper and lower bearings 14 and 15, mounted on the front of the hopper. To the upper extremity of the shaft 13 is made fast a bevel-gear 16, meshing with a gear 17, fast on a horizontal shaft 18, to which is also made fast a friction-disk 19, the disk being splined on the shaft, as shown in Fig. 6, and locked against outward endwise movement by a split lock-nut 20, having lugs connected by a bolt 21, to which is applied a tightening-nut 22. Loosely mounted on the shaft 18, adjacent to the fast friction-disk 19, is a coöperating friction-disk 23, formed integral with a sleeve 24, whose face remote from the disk is beveled or inclined, as shown at 25, and engages a part 26, having a correspondingly-beveled opposing face 27. These two opposing beveled or inclined faces form two engaging wedges, and as one of them is given a partial rotary movement it is evident that the cam action, due to the relative change of position of the two engaging faces, will force the loose friction-disk into operative relation with the fast friction-disk, the terms "loose" and "fast" being used with reference to the relation between the disks and the shaft upon which they are mounted.

In order to take up all lost motion between the two friction-faces and hold them in such proximity that their action will be immediate as soon as the part 26 is moved, the sleeve 24 is provided with a lug 28, having an opening in its outer extremity through which is passed a bolt 29, which passes through an opening in a relatively stationary lug 30, with which the housing 33 is provided. Below the lug 30 the bolt is surrounded by a coil-spring 31, while to the lower extremity of the bolt below the spring is applied a thumb-nut 32. It is evident that by means of this nut the tension of the spring may be regulated at will. The tension of this spring is kept at such a degree as to act on the friction-face 23 through the instrumentality of the opposing wedges, whereby the disk 23 is automatically and normally kept in close contact with the friction-disk 19. The opening in the lug 28 through which the bolt 29 passes is somewhat enlarged to compensate for the change of position of the parts during the performance of the tension-bolt's function.

The sleeve 24, together with the parts having the wedge-shaped opposing faces, is inclosed by the housing 33, made fast to the wedge 26, the latter being in turn rigidly connected with a lever 34, fulcrumed on the shaft 18, and whose long arm 35 is provided at its outer extremity with a cushion-tappet 36, which occupies a position in the path of a part on the stem of a stamp (not shown) or other suitable actuating device. The short arm 37 of the lever 34 is provided on opposite sides with wrists 38, which are connected, by means of tie-rods 39, (best shown in Fig. 8,) with a cross-head 40, slidably mounted on a screw-shaft 41. This shaft 41 passes through openings formed in lugs 42 and 43, projecting outwardly from the front of the hopper. Between the lug 43 and the cross-head 41 is located a coil-spring 44. Seated in a socket formed in the lug 43 is a nut 45, which is angular in shape, while the recess 46, in which it is located, is of corresponding shape, whereby the nut is locked against rotation when the screw-shaft is turned. The portion of the shaft 41 which passes through this nut is threaded, as shown at 47, while the upper extremity of the shaft is enlarged, as shown at 48, and bears against the under side of the short arm 37 of the lever 34. To the lower extremity of the shaft 41 is made fast a hand-wheel 49, whereby the said shaft may be actuated for the purpose of regulating the stroke of the lever 34 in a manner that will be readily understood. As the shaft 41 is rotated its upper extremity 48 will be raised or lowered, according to the direction of rotation, by virtue of the threaded engagement of the shaft with the nut 45. The lower portion of the shaft is threaded, and to it is applied a lock-nut 50, having a hand-wheel 51, which after the shaft is properly adjusted is screwed tightly against the lower stationary lug 43, whereby the shaft is locked in the adjusted position.

Upon the housing 33 is mounted an oil-cup 51 for supplying lubricating material to the shaft 18. The sleeve 24 is provided with an orifice 52 to allow the oil to pass through the sleeve to the shaft. As it is not desirable for the oil to reach the faces of the friction-disks 19 and 23, a groove 53 is formed in the disk 23 immediately surrounding the shaft to take up the waste oil, and communicating with this groove is a duct 54, extending downwardly for conducting the oil into the housing and away from the friction-faces of the disks.

From the foregoing description the operation of my improved ore-feeder as thus far described will be readily understood. Assuming that the mechanism is properly adjusted, as a part on the stem of a descending stamp (not shown) strikes the cushion-tappet 36 of the lever 34 the tappet end of the lever will be carried downwardly, imparting a partial rotary movement to the wedge 26, whose face 27, acting on the opposite wedge-face 25, performs the function of a cam and forces the friction-disk 23 against the disk 19 to the extent of the cam action of the wedges. It is evident that as the two friction-faces are forced tightly together the partial rotary movement imparted to the wedge 26 will also be imparted to the friction-disk 19, whereby a corresponding partial rotary movement will be imparted to the shaft 18, whereby the shaft 13 and its disk 10 will be actuated by virtue of the gearing connection between the shafts 13 and 18, and this operation will be repeated every time the actuating-stamp drops. As soon as the lever-arm is released from engagement with the stamp the tension of the spring 44 will return the lever to its normal position. Every time a partial rotary movement is imparted to the disk 10 a part of the ore, which has escaped from the hopper and is lying on the disk in front of the hopper, will be discharged from the hopper and delivered to the mortar of the stamp-battery, to which the ore or other material contained in the hopper is to be fed.

When it is desired to operate the feeder from a motor or line-shaft instead of from a stamp-stem, the construction shown in Figs. 10 and 11 may be employed. In this case a shaft 55 is journaled in suitable boxes 56, mounted on the hopper, the shaft being provided at one extremity with a pulley 57, which may be connected with a belt from a motor or line-shaft, as may be desired. Upon this shaft 55 is mounted a cam 58, which acts on a roller or antifrictional device 59, journaled in the outer extremity of a lever-arm 60, whose opposite extremity is movably mounted on the shaft and made fast to the wedge 26, as in the other form of construction. The means for returning the lever-arm 60 to its normal position or to its lowest limit of movement is substantially the same as that already described when describing the return movement of the lever 34, the said mechanism being illustrated in detail in Fig. 8. In this case the tie-rods 39 are connected with the lever-arm 60, as shown at 61. In other respects the construction is precisely the same as that heretofore described. The cam 58 is elongated, and the lever-arm 60 is actuated twice for every rotation of the shaft 55. It is evident, however, that this cam may be of any desired shape.

In the construction shown in Figs. 12 and 13 the horizontal shaft 18 is dispensed with, and a short shaft 62 is mounted in bearings 63 and 64, supported on the hopper, and the friction-disks 19 and 23, together with the parts 24 and 26, having the wedge-shaped opposing faces 25 and 27, are mounted directly on the shaft 13. In this case the lever 34 is fulcrumed on the short shaft 62 and is provided above the shaft with a bifurcated lug 65, which straddles a projection 66, rigidly connected with the wedge 26. The other parts are substantially of the same construction as shown in the other views, bearing in mind that the parts 19, 23, and 26 are mounted on the shaft 13 instead of the shaft 18. The housing 33 also occupies the same relation to the other parts as in the other views, except that it surrounds the shaft 13 instead of the shaft 18. Assuming that the parts are in the relative position shown in Fig. 13, it is evident that if the outer extremity of the lever 34 be moved downwardly in the manner heretofore described the bifurcated lug 65, acting on the projection 66, will impart a partial rotary movement to the wedge 26, whereby the cam action of the wedge-shaped opposing faces will be sufficient to cause the friction-disks 19 and 23 to engage each other in operative relation, whereby the shaft 13 is actuated to operate the disk 10 in the manner heretofore explained, except that the said parts act on the shaft 13 without the intervention of the shaft 18 and the gears, as in the other forms of construction.

Interposed between the friction-disks 19 and 23 is a washer A, composed of belting or other suitable material adapted to increase the friction between the two disks. This washer A engages a shoulder formed on the disk 23, whereby it is prevented from coming in direct contact with the shaft. In this way it is kept from contact with the lubricating material.

Attention is called to the fact that the housing 33 forms a receptacle for the lubricating material, which enters it through the duct 54. The two friction wedge faces 25 and 27 dip into the lubricating material of the housing, and are thus kept suitably lubricated. This is a feature of considerable importance.

Having thus described my invention, what I claim is—

1. In an ore-feeder, the combination with a receptacle adapted to hold the ore or other material, of a feed-plate mounted below the receptacle, and a revoluble shaft connected in operative relation with the plate, of two parts mounted on the said shaft and having wedge-shaped opposing faces capable of independent revoluble movement, one of the parts being also axially movable on the shaft and having a friction-face, another friction-face connected in operative relation with the said shaft, and means for imparting a rotary movement to one wedge-faced part, whereby the opposing part is shifted axially to bring the friction-faces into operative relation to actuate the shaft and feed-plate, substantially as described.

2. In an ore-feeder, the combination with a receptacle adapted to hold the ore or other material, a feed-plate mounted below the receptacle, and a revoluble shaft connected in operative relation with the said plate, of two parts having wedge-shaped opposing faces, a shaft upon which the wedge-faced parts are loosely mounted, one being axially movable thereon, and provided with a friction-face, another friction-face fast on the shaft and connected in operative relation with the shaft of the feed-plate, and means for imparting a rotary movement to one wedge-faced part whereby the other wedge part is shifted axially on the shaft and the friction-faces brought into operative relation for the purpose set forth.

3. In an ore-feeder, the combination with a receptacle adapted to hold the ore or other material, and a feed-plate revolubly mounted below the receptacle, of two parts having wedge-shaped opposing faces, a shaft on which the wedge-faced parts are loosely mounted, said shaft being connected in operative relation with the feed-plate, one wedge-faced part being axially movable and provided with a friction-face, and another friction-face fast on the shaft and connected in operative relation with the feed-plate, and means for imparting a rotary movement to one wedge-faced part whereby the other wedge part is shifted axially on the shaft and the friction-faces brought into operative engagement for the purpose set forth.

4. In an ore-feeder, the combination with a hopper, a feed-plate mounted below the hopper, a revoluble shaft to which the feed-plate is made fast, a second shaft geared to the feed-plate shaft, a lever-arm fulcrumed on the second shaft and provided with a wedge-faced part, an opposing wedge-faced part movable in the line of the shaft's axis, the axially-movable wedge-shaped part having a friction-face, another friction-face fast on the second shaft, and means for actuating the lever-arm whereby the wedge part having the friction-face is shifted to bring the two friction-faces into operative relation for the purpose set forth.

5. The combination with a receptacle, a feed-plate and an actuating-shaft, of a second shaft geared to the feed-plate shaft, a lever fulcrumed on the second shaft and provided with a wedge-faced part rigidly connected therewith, an opposing wedge-faced part loose on the second shaft and movable thereon in the line of the shaft's axis, the axially-movable part having a friction-face, another friction-face fast on the second shaft, means for actuating the lever to throw the friction-faces into operative engagement, and suitable means connected with the lever for returning the latter to its normal position after each movement of the feed-plate.

6. The combination with a suitable receptacle and a revoluble plate, of a shaft suitably journaled and connected in operative relation with the feed-plate, a lever fulcrumed on the shaft and provided with a wedge-faced part rigidly connected therewith, another wedge-faced part loose on the shaft and provided with a friction-face, another friction-face fast on the shaft, means connected with the loose wedge-faced part for taking up lost motion between the friction-faces, and means for actuating the lever whereby the wedge-faced part connected therewith is actuated and the relative position of the two wedge-faced parts changed by a cam action to bring the friction-faces into operative relation for the purpose set forth.

7. The combination with a feed-plate and a shaft connected in operative relation therewith, of a second shaft geared to the feed-plate shaft, a lever fulcrumed on the second shaft and provided with a wedge-faced part rigidly connected therewith, an opposing wedge-faced part loose on the second shaft and movable thereon in the line of the shaft's axis, the axially-movable part also having a friction-face, another friction-face fast on the second shaft, tension means connected with the wedge-faced part having a friction-face for taking up lost motion between the two friction-faces, and means for actuating the lever whereby the wedge faces are shifted angularly to bring the friction-faces into operative engagement.

8. In an apparatus of the class described, the combination with a rotary feed-plate, and a shaft connected in operative relation with the said plate, of a lever fulcrumed on the shaft, a wedge face rigidly connected with the lever and loose on the shaft, a part having an opposing wedge face at one extremity, and a friction-face at the opposite extremity, the same being loose on the shaft, a friction-face fast on the shaft, means for actuating one arm of the lever to shift the wedge faces angularly and bring the friction-faces into inoperative engagement, and means connected with the opposite arm of the lever for returning the latter to its normal position after each operation of the feed-plate, said means comprising tie-rods connected at their upper extremities with the lever, a screw-shaft, a crosshead slidable thereon and with which the lower extremities of the tie-rods are connected, the screw-shaft passing through openings formed in upper and lower stationary parts, the upper extremity of the screw-shaft engaging the lever, a nut mounted in the upper stationary part and locked against rotation, the screw-shaft being threaded to engage said nut, the extremity of the screw-shaft remote from the lever being equipped to facilitate the manipulation of the shaft, the lower part of the shaft being threaded, and a lock-nut mounted on the lower threaded part of the shaft for the purpose set forth.

9. The combination with a rotary feed-plate, of a shaft connected in operative relation therewith, a lever fulcrumed on the shaft and provided with a part having a wedge face through which the shaft also passes, another part loose on the shaft and having an opposing wedge face and also provided with a friction-face, another friction-face fast on the shaft, a housing connected with the lever and surrounding the opposing wedge faces, and means for actuating the lever whereby the wedge faces are shifted angularly to bring the friction-faces into operative engagement, substantially as described.

In testimony whereof I affix my signature in presence of two witnesses.

NORMAN V. FITTS.

Witnesses:
 A. J. O'BRIEN,
 DENA NELSON.